Patented Dec. 25, 1951

2,579,478

UNITED STATES PATENT OFFICE 2,579,478

HETEROCYCLIC COMPOUNDS

Carl Djerassi, Morristown, and Caesar R. Scholz, Summit, N. J., assignors to Ciba Pharmaceutical Products, Incorporated, Summit, N. J., a corporation of New Jersey No Drawing. Application June 7, 1948, Serial No. 31,608

9 Claims. (Cl. 260—243)

The present invention relates to a new series of compounds which are characterized by the fact that the molecules thereof contain the moiety

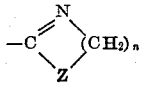

wherein Z may be an oxygen or a sulfur atom, and $(CH_2)_n$ may be $-CH_2-CH_2-$ (in which case the compound is an oxazoline or a thiazoline) or may be $-CH_2-CH_2-CH_2-$ (in which case the six-membered compound is a pentoxazoline or pentthiazoline, the latter of which may also be designated a 4,5-dihydrothiazine).

Heterocyclic compounds of this type, substituted in the 2-position, have been known for a long time. However, these known compounds have generally contained a 2-alkyl or a 2-aryl group.

A primary object of the present invention is the development of compounds of the aforesaid type which contain 2-substituents of a different type from those of the known compounds and which are characterized by considerably different chemical and physiological potentialities and properties. More specifically, the compounds of the present invention may be regarded as derivatives of the 2-hydroxy-, 2-mercapto- and 2-amino-alkyl heterocycles of the formula

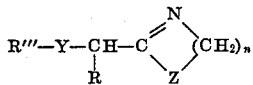

wherein $n$ is one of the integers 2 and 3, Z stands for an oxygen or a sulfur atom, R represents hydrogen or a lower alkyl group such as methyl, ethyl or the like, Y is an oxygen or sulfur or nitrogen atom, and R''', when Y is oxygen or sulfur, is a nuclearly substituted or unsubstituted aryl or aralkyl group, the nuclear substituents being lower alkyl, halogen, aryl and the like, and when Y is nitrogen, stands for two substituents connected to the nitrogen atom, as for example

wherein R' and R'' may be alkyl such as methyl, ethyl and the like, aralkyl such as benzyl, or aryl such as phenyl.

A further object of the invention is the embodiment of processes for the preparation of the said new compounds. The latter can, according to the invention, be prepared by cyclization of an appropriately substituted amide which may correspond for example to the formula $$R'''-Y-CHR-\overset{Z}{\overset{\|}{C}}-NH(CH_2)_nX$$

wherein X is hydroxyl or halogen and R, R''', Y, Z and $n$ have the significances hereinbefore set forth. Alternatively, the component parts of the thiazoline and pentthiazoline rings may be combined in a single reaction.

The following reaction schemes, wherein the variables have the afore-indicated meanings, summarize the various alternative procedures according to the invention for preparing the new compounds:

(A) $R'''-Y-CHR-CS-NH_2 + Br(CH_2)_nNH_2 \longrightarrow$ (B) $R'''-Y-CHR-CS-NH_2 + Br(CH_2)_nNH_2 \cdot HBr \longrightarrow$ (C) $R'''-Y-CHR-CS-NH_2 + Br(CH_2)_nX \longrightarrow$ (D) $R'''-Y-CHR-CO-NH(CH_2)_nX \xrightarrow{P_2S_5}$ (E) $R'''-Y-CHR-CO-NH(CH_2)_nBr \xrightarrow{NaOH}$ The several reaction products correspond to the precedingly-indicated formula (I), with Z being S in reactions (A), (B) and (C), and O in the other two reactions.

The new compounds may be isolated in the form of readily crystallizable salts, preferably for example as the picrates, and the latter converted with an alkaline hydroxide (such as lithium hydroxide, potassium hydroxide or the like) solution to the corresponding bases, which can then be extracted with water-immiscible solvents, such as ether, chloroform or the like, and then converted, for example with the aid of the corresponding acid directly into water-soluble salts such as the hydrochlorides, hydrobromides, sulfates, phosphates, succinates, malates, etc.

The compounds of the invention are useful as therapeutic agents or as intermediates for the preparation of such agents.

In the following examples, specific embodiments illustrating the invention and the several aforesaid alternative procedures for realizing the same are described in detail. It is to be understood, however, that these are presented by way of exemplification only and not of limitation. Thus, the specific reactants mentioned in the said examples may be replaced by any other similarly constituted reactants within the scope of the aforesaid indications. In the said examples, the parts are by weight except as otherwise indicated. Parts by weight bear the same relation to parts by volume as does the gram to the cubic centimeter. Temperatures are in degrees centigrade.

EXAMPLE 1

An intimate mixture of 3.65 parts of p-diphenyloxyacetothioamide (melting at 186–188°; prepared in the usual manner from the corresponding nitrile by the action of ammonia and hydrogen sulfide in methanol solution under pressure) and 2.72 parts of 3-bromopropylamine hydrobromide is heated at 160° for ten minutes. The dark melt is cooled, dissolved in ethanol and treated with an ethanolic solution of picric acid. 2-(p-diphenyloxymethyl)-pentthiazoline picrate is thus obtained in substantially pure form as yellow crystals melting at 174–176° (dec.). On treating the picrate with lithium hydroxide solution, extracting the base with ether, evaporating and recrystallizing from a mixture of hexane and acetone, there are obtained long colorless needles of 2 - (p - diphenyloxymethyl) - pentthiazoline which melt at 61–63° and correspond to the formula:

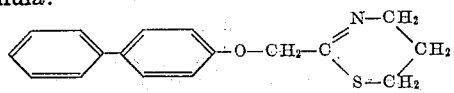

Using exactly the same procedure, but substituting 2-bromoethylamine hydrobromide for the 3 - bromopropylamine hydrobromide, 2 - (p - diphenyloxymethyl) - thiazoline picrate which melts at 177–179° is isolated, the product having the formula:

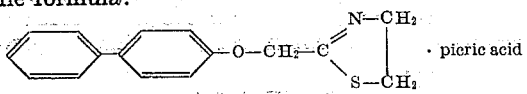

EXAMPLE 2

A mixture of 4.05 parts of N,N-dibenzylaminoacetothioamide (whose melting point is 96–98°) and 3.3 parts of 3-bromopropylamine hydrobromide is heated for twenty minutes at 125°, the melt partitioned between dilute hydrochloric acid and ether, the acid extracts made alkaline with aqueous ammonium hydroxide solution and the precipitated base isolated by ether extraction, washing, drying and evaporating. Treatment with ethanolic picric acid solution affords the bright yellow crystals of 2-(N,N-dibenzylaminomethyl)-pentthiazoline picrate melting at 147–150° (dec.) and corresponding to the formula:

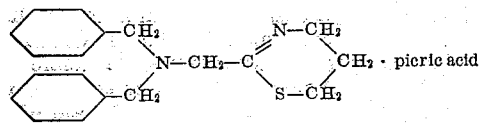

When 3.07 parts of 2-bromoethylamine hydrobromide are employed, the picrate of the corresponding thiazoline derivative melting at 160–162° is isolated.

EXAMPLE 3

A solution of 3.85 parts of N-benzyl-N-phenylaminoacetothioamide (which melts at 175–177°) and 3.3 parts of 3-bromopropylamine hydrobromide in 150 parts by volume of absolute ethanol is refluxed for four hours and the solvent evaporated. The reaction mixture is then partitioned between acid and ether as described in Example 2, some unreacted thioamide is recovered from the ether layer, and the residue from the acid solution (after making alkaline and extracting with ether) is treated with picric acid solution. 2-(N - benzyl - N - phenylaminomethyl)-pentthiazoline picrate melting at 179–180° (dec.) is obtained.

Instead of using 3-bromopropylamine hydrobromide, the free bromopropylamine base can be condensed with the above thioamide in benzene solution to form the same pentthiazoline.

EXAMPLE 4 p-Methylphenylthioacetonitrile is converted with ammonia and hydrogen sulfide to the corresponding thioamide (melting at 101–102°) and 5.9 parts of the latter is heated with 5.45 parts of 3-bromopropylamine hydrobromide at 130° for ten minutes. After working up as in the preceding examples, the picrate of 2-(p-methylphenylthiomethyl) - pentthiazoline melting at 131–132° is isolated. The latter is converted to the free base with potassium hydroxide and ether and the base in ethanol solution is treated with the calculated stoichiometric amount of hydrogen chloride. Addition of ether precipitates the water-soluble hydrochloride which melts at 177–179°. The picrate of the corresponding thiazoline derivative has the same melting point, but gives a significant depression when mixed with the pentthiazoline picrate.

EXAMPLE 5

A mixture of 5.45 parts of 2-bromoethyl-m-toloxy-acetamide (melting point 81–83°; prepared in the known manner from m-toloxy-acetyl chloride and 2-bromoethylamine in the presence of alkali), 0.9 part of phosphorus pentasulfide and 100 parts by volume of dry toluene is refluxed for four hours. The toluene solution is diluted with ether, the organic layer extracted several times with 5% hydrochloric acid, the extract made alkaline with aqueous ammonium hydroxide solution, extracted with ether, dried and evaporated. Conversion to the picrate and recrystallization from ethanol gives 2-(m-toloxymethyl)-thiazoline picrate which melts at 188–190°.

EXAMPLE 6

3 - bromopropyl - α - phenoxypropionamide (which melts at 50–52°) is prepared from 3-bromopropylamine and α - phenoxypropionyl chloride, and 5.7 parts of the amide are treated with 0.9 part of phosphorus pentasulfide in toluene solution and the product isolated as above (Example 5). The 2-(α-phenoxyethyl)-pentthiazoline picrate, thus obtained, melts at 126–128°.

EXAMPLE 7

A solution of 7 parts of phenoxyacetothioamide in 7 parts of trimethylene chlorobromide is refluxed for two and one-half hours and the solution cooled and diluted with ether. The pentthiazoline is extracted with 5% hydrochloric acid, the extracts made alkaline and extracted with ether. This procedure is repeated and the resulting base is treated with picric acid in ethanol solution yielding 2-(phenoxymethyl)-pentthiazoline picrate, melting at 177–179°, as fine, yellow needles. The hydrochloride melts at 162.5–164°.

When ethylene dibromide is substituted for trimethylene chlorobromide, the corresponding thiazoline identical with the product described in Example 8 is obtained.

EXAMPLE 8

A solution of 3.9 parts of 2-hydroxyethyl phenoxyacetamide (melting point 86–88°; as prepared by the action of phenoxyacetylchloride upon 2-aminoethanol in the presence of alkali) and 0.9 part of phosphorus pentasulfide in 80 parts by volume of toluene is refluxed for twenty hours and then worked up as in Example 5. The obtained 2-(phenoxymethyl)-thiazoline picrate melts at 177–179° and conversion to the free base and treatment with hydrogen chloride give the hydrochloride which melts at 147–149° and is freely soluble in water.

EXAMPLE 9

Benzhydryloxyacetic acid (melting at 77–79°) is converted into its acid chloride and the latter is condensed with 3-bromopropylamine to yield the 3-bromopropyl benzhydryloxyacetamide which melts at 94–95°. 7.1 parts of this amide in 100 parts by volume of ethanol are boiled for a few minutes with a solution of 0.9 part of sodium hydroxide in 4 parts by volume of water and 20 parts by volume of ethanol and the resulting solution is evaporated to dryness. The residue is extracted with ether, filtered, and the ether evaporated. Treatment of the residue with picric acid in ethanol solution gives 2-benzhydryloxymethyl)-pentoxazoline picrate melting at 164–166°.

EXAMPLE 10

Thymoxyacetylchloride is converted to 2-bromoethyl thymoxyacetamide (melting point 56–58°) and 6.3 parts of the latter is treated as in Example 9 with 0.9 part of sodium hydroxide. After working up as above, 2-(thymoxymethyl)-oxazoline picrate melting at 142–143.5° is obtained.

In manner analogous to the foregoing, it is possible to prepare inter alia the salts and intermediates shown in the following tables:

*Acetothioamides*

| Name: | Melting point, °C. |
|---|---|
| N-ethyl-N-phenylamino | 139–140 |
| Benzhydryloxy | 113–115 |
| Thymoxy | 134–135 |
| p-Chlorophenoxy | 105–107 |

*N-(2-bromoethyl) acetamides*

| | |
|---|---|
| Benzhydryloxy | 92– 93 |
| Phenoxy | 75– 76.5 |
| Carvacryloxy | 83– 84.5 |
| 2,5-dimethylphenoxy | 99–101 |
| p-Chlorothymoxy | 72– 74 |
| α-Phenoxypropionamide | 56– 58 |

*N-(3-bromopropyl) acetamides*

| | |
|---|---|
| Phenoxy | 67 –69 |
| Thymoxy | 62 –64 |
| Carvacryloxy | oil |
| m-Toloxy | 61 –63 |
| 2,5-dimethylphenoxy | 85.5–87.5 |
| p-Chlorothymoxy | 66 –68 |
| α-Phenoxypropionamide | 50 –52 |

*2-Methyl substituted thiazoline picrates*

| | |
|---|---|
| N-benzyl-N-phenylamino | 145 –146 |
| N,N-dibenzylamino | 160 –162 |
| Benzhydryloxy | 138 –140 |
| Thymoxy | 166.5–168.5 |
| Carvacryloxy | 165 –167 |
| 2,5-dimethylphenoxy | 176 –178.5 |
| p-Diphenyloxy | 177 –179 |
| p-Chlorophenoxy | 166 –168 |
| p-Methylphenylthio | 131 –133 |
| p-Chlorothymoxy | 191.5–193 |
| 2-(α-Phenoxyethyl)-thiazoline picrate | 132 –134 |

*2-Methyl substituted pentthiazoline picrates*

| | |
|---|---|
| Benzhydryloxy | 147–150 |
| m-Toloxy | 168–170 |
| Thymoxy | 183–185 |
| 2,5-dimethylphenoxy | 175–175.5 |
| p-Chlorophenoxy | 178–179 |
| p-Chlorothymoxy | 190–193 |
| 2-(α-Phenoxyethyl)-pentthiazoline picrate | 126–128 |

*2-Methyl substituted oxazoline picrates*

| | |
|---|---|
| Benzhydryloxy | 134–135 |
| Phenoxy | 160–162 |
| m-Toloxy | 149–151 |
| Carvacryloxy | 154–155 |
| 2,5-dimethylphenoxy | 142–144 |
| p-Chlorothymoxy | 165–167 |
| 2-(α-Phenoxyethyl)-oxazoline picrate | 130–132 |

*2-Methyl substituted pentoxazoline picrates*

| | |
|---|---|
| Phenoxy | 199 –201 |
| m-Toloxy | 168 –170 |
| Thymoxy | 136 –137.5 |
| Carvacryloxy | 110 –112 |
| 2,5-dimethylphenoxy | 148.5–149.5 |
| p-Chlorothymoxy | 153 –155 |
| 2-(α-Phenoxyethyl)-pentoxazoline picrate | 121 –123 |

Having thus disclosed the invention, what is claimed is:

1. A member of the group consisting of compounds of the formula

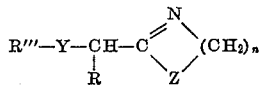

wherein n is one of the integers 2 and 3, Z stands for a member selected from the group consisting of oxygen and sulfur, R represents a member selected from the group consisting of hydrogen and lower alkyl, Y is a member selected from the group consisting of oxygen, sulfur and nitrogen, and R''', when Y is oxygen or sulfur, is a member selected from the group consisting of aryl, aralkyl, alkyl-substituted aryl, halogen-substituted aryl, halogen-substituted aralkyl and alkyl-substituted aryl, and salts thereof, and when Y is nitrogen, is the groupings

wherein R' and R'' each stands for a member selected from the group consisting of alkyl, aralkyl and aryl, and the halogen being selected from the group consisting of chlorine and bromine.

2. A compound of the formula

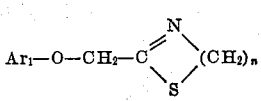

wherein Ar₁ is an aryl group, and n is an integer from 2 to 3.

3. A compound of the formula

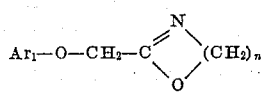

wherein Ar₁ is an aryl group, and $n$ is an integer from 2 to 3.

4. A compound of the formula

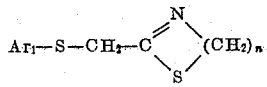

wherein Ar₁ is an aryl group, and $n$ is an integer from 2 to 3.

5. A process for the preparation of a compound of the formula

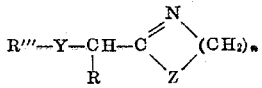

which comprises heating a compound of the formula

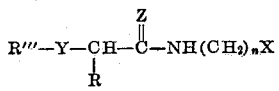

wherein $n$ is one of the integers 2 and 3, Z stands for a member selected from the group consisting of oxygen and sulfur, R represents a member selected from the group consisting of hydrogen and lower alkyl, Y is a member selected from the group consisting of oxygen, sulfur and nitrogen, and R‴, when Y is oxygen or sulfur, is a member selected from the group consisting of aryl, aralkyl, alkyl-substituted aryl, halogen-substituted aryl, halogen-substituted aralkyl and alkyl-substituted aryl, and when Y is nitrogen, is the grouping

wherein R′ and R″ each stands for a member selected from the group consisting of alkyl, aralkyl and aryl, the halogen being selected from the group consisting of chlorine and bromine, and X represents a member selected from the group consisting of hydroxyl, chlorine and bromine.

6. A process for preparing a thiazoline which comprises heating a compound of the formula

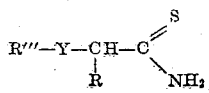

with a halogenated alkyl amine of the formula

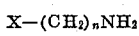

wherein $n$ is one of the integers 2 and 3, R represents a member selected from the group consisting of hydrogen and lower alkyl, Y is a member selected from the group consisting of oxygen, sulfur and nitrogen, and R‴, when Y is oxygen or sulfur, is a member selected from the group consisting of aryl, aralkyl, alkyl-substituted aryl, halogen-substituted aryl, halogen-substituted aralkyl and alkyl-substituted aryl, and when Y is nitrogen, is the grouping

wherein R′ and R″ each stands for a member selected from the group consisting of alkyl, aralkyl and aryl, the halogen being selected from the group consisting of chlorine and bromine, and X represents a member selected from the group consisting of hydroxyl, chlorine and bromine.

7. A process for the preparation of a thiazoline which comprises heating a compound of the formula

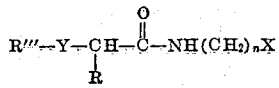

wherein $n$ is one of the integers 2 and 3, R represents a member selected from the group consisting of hydrogen and lower alkyl, Y is a member selected from the group consisting of oxygen, sulfur and nitrogen, and R‴, when Y is oxygen or sulfur, is a member selected from the group consisting of aryl, aralkyl, alkyl-substituted aryl, halogen-substituted aryl, halogen-substituted aralkyl and alkyl-substituted aryl, and when Y is nitrogen, is the grouping

wherein R′ and R″ each stands for a member selected from the group consisting of alkyl, aralkyl and aryl, the halogen being selected from the group consisting of chlorine and bromine, and X represents a member selected from the group consisting of hydroxyl, chlorine and bromine, with phosphorus pentasulfide.

8. A process for the preparation of a thiazoline which comprises heating a compound of the formula

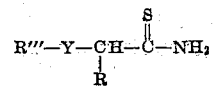

with a compound of the formula

wherein $n$ is one of the integers 2 and 3, R represents a member selected from the group consisting of hydrogen and lower alkyl, Y is a member selected from the group consisting of oxygen, sulfur and nitrogen, and R‴, when Y is oxygen or sulfur, is a member selected from the group consisting of aryl, aralkyl, alkyl-substituted aryl, halogen-substituted aralkyl and alkyl-substituted aryl, and when Y is nitrogen, is the grouping

wherein R′ and R″ each stands for a member selected from the group consisting of alkyl, aralkyl and aryl, and the halogen being selected from the group consisting of chlorine and bromine.

9. A process for the preparation of an oxazoline which comprises heating a compound of the formula

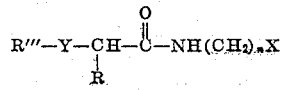

wherein $n$ is one of the integers 2 and 3, R represents a member selected from the group consisting of hydrogen and lower alkyl, Y is a member selected from the group consisting of oxygen, sulfur and nitrogen, and R‴, when Y is oxygen or sulfur, is a member selected from the group consisting of aryl, aralkyl, alkyl-substituted aryl, halogen-substituted aryl, halogen-substituted aralkyl and alkyl-substituted aryl, and when Y is nitrogen, is the grouping

wherein R' and R'' each stands for a member selected from the group consisting of alkyl, aralkyl and aryl, the halogen being selected from the group consisting of chlorine and bromine, and X represents a member selected from the group consisting of hydroxyl, chlorine and bromine, with sodium hydroxide.

CARL DJERASSI.
CAESAR R. SCHOLZ.

REFERENCES CITED

The following references are of record in the file of this patent:

UNITED STATES PATENTS

| Number | Name | Date |
|---|---|---|
| 2,402,198 | Loder | June 18, 1946 |